(No Model.)
A. PERKINS.
CYCLE HUB.
No. 494,076. Patented Mar. 21, 1893.
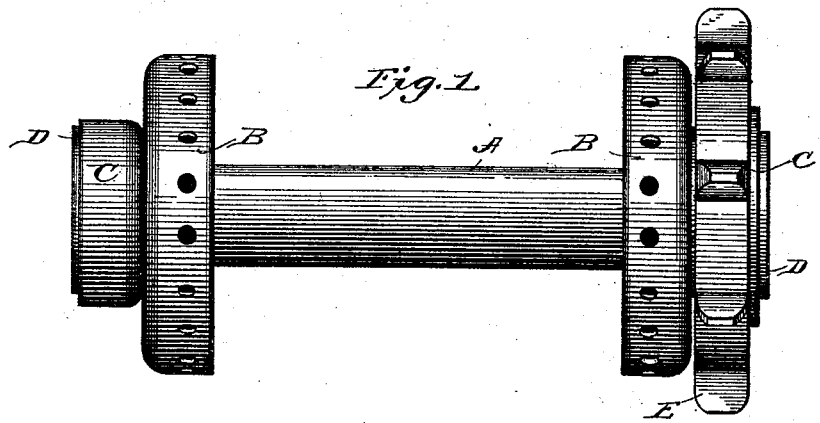
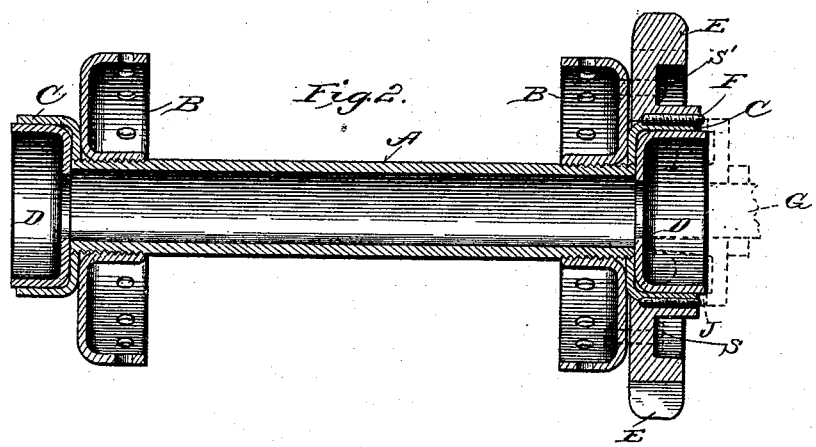
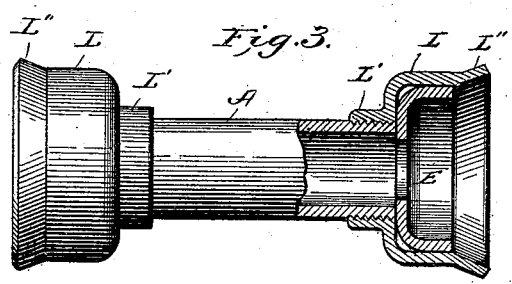
Witnesses:
Harry S. Rohrer
E. H. Brog.
Inventor:
Albert Perkins
By Wiles & Greene,
Attorneys.
THE NORRIS PETERS CO., PHOTO-LITHO., WASHINGTON, D. C.

UNITED STATES PATENT OFFICE.

ALBERT PERKINS, OF CHICOPEE, MASSACHUSETTS, ASSIGNOR TO A. G. SPALDING & BROTHERS, OF NEW YORK, N. Y., AND THE LAMB KNITTING MACHINE MANUFACTURING COMPANY, OF CHICOPEE FALLS, MASSACHUSETTS.

CYCLE-HUB.

SPECIFICATION forming part of Letters Patent No. 494,076, dated March 21, 1893.

Application filed September 5, 1892. Serial No. 445,087. (No model.)

*To all whom it may concern:*

Be it known that I, ALBERT PERKINS, a citizen of the United States, residing at Chicopee, in the county of Hampden and State of Massachusetts, have invented certain new and useful Improvements in Cycle-Hubs; and I do hereby declare the following to be a full, clear, and exact description of the invention, such as will enable others skilled in the art to which it appertains to make and use the same.

The object of this invention is to produce a hub lighter, cheaper, and less liable to imperfection than the common cycle hubs.

In the drawings, Figure 1 is an elevation of the rear driving hub with the sprocket wheel attached. Fig. 2 is a central, longitudinal section of the same. Fig. 3 shows the front wheel hub partly in elevation, and partly in central, longitudinal section.

Both hubs consist of a central tube or hub shaft and certain parts independently struck up from sheet steel and afterward secured to the tube. For the rear hub sheet steel is struck up into the form of cups B which are U-shaped in radial cross section and are internally threaded to screw upon the threaded ends of the central tube A. Smaller cups C, U-shaped in diametrical cross section, are also struck up from sheet metal, centrally perforated and threaded and screwed against the other cups upon the hub shaft, base to base, the parts being so proportioned that when in position the hub shaft extends just through the bottom wall of the smaller cups. All these parts are then united into one whole by brazing. Hardened ball cases D of greater depth than the cups C are then fixed in the latter, and a sprocket wheel E is fitted over one of the cups and secured by screws F lying partly in the sprocket wheel, partly in the cup wall. The hub is now ready for its final finishing. When it is to be mounted upon its axle, the latter G is inserted, balls are placed in the ball cases and cones are screwed into position upon the axle and locked by the usual nuts.

As shown in dotted lines the cone is provided with a case-covering cap I having a marginal flange J which encircles the projecting part of the case and extends inward nearly to the edge of the enveloping cup C. The intervening space is filled by a washer J of soft leather or felt. This cone is not however claimed in this application except in combination with the other parts but in application Serial No. 445,089. The hub of the front wheel may be made like the rear hub except that no sprocket is required, but as it bears less weight, receives far less lateral strain and is not subjected to the strain of propulsion, I prefer the construction of Fig. 3. The tube A is made shorter but is threaded as before. Upon the threaded ends are screwed cups L, also struck up from sheet steel, but is such form that each cup has at its center an external tubular extension $L'$. This is internally threaded to receive the shaft end, which extends just through the bottom of the cup, and to which it is brazed. In each case is fixed a ball case E of less depth than the cup. The projecting portion of the cup is bent outward to form a conical flange $L''$ diverging from the ball case and serving for the attachment of the spokes. When the hub is to be mounted, it is placed upon an axle and secured by the usual balls, suitable cones and locknuts. Each spoke is perpendicular to the conical flange and hence no bending of the spoke and no oblique perforation nor fitting of either part is necessary.

In considering the rear hub it is to be observed that with no apparent lengthening of the hub the bearings are unusually far apart, the balls being outside the planes of the spoke ends. It is therefore better adapted to stand the constant and severe lateral thrusts of the rider's weight. Again, the balls upon the chain side are in the plane of the sprocket wheel and the pull of the chain therefore has only the leverage that tends to produce rotation,—none to produce useless strain of the parts. In both hubs the construction is simple, extremely light, and such as to distribute the metal to excellent advantage.

Another advantage to both manufacturer and user is that the parts are made independently and if in any degree imperfect may be rejected without the loss of labor and material belonging to other parts. This is a saving to the manufacturer, and the consumer finds each part perfect.

The cups or hub flanges are shown and have been described as screwed upon the central tube, and this construction is preferred as somewhat stronger; yet evidently they may be forced upon the tube, without threading, and brazed in position, still forming a serviceable hub. The sprocket wheel may also be secured to the hub by means other than the joint screws shown and described, for example by screws or bolts passing from it directly to the hub flange as suggested in dotted lines at S, S', Fig. 2. These and other slight variations are within the scope of the invention.

What I claim is—

1. The hub consisting of a central tube having upon each end a pair of sheet steel cups placed back to back and brazed to each other and to the tube.

2. The combination with four sheet steel cups placed back to back in pairs, of a tube having each end passed centrally through one pair of cups, and a ball-case fixed in the outer cup of each pair; the four cups and the tube being inseparably united into one whole, substantially as set forth.

3. The combination with the central tube, of a cup U-shaped in radial cross section fixed thereon, a sprocket wheel resting against the bottom of the cup, and screws, or the like, passing through the sprocket wheel and fixing it to the bottom of the cup.

4. The combination with the steel tube or hub shaft, of the independently formed cups U-shaped in radial cross section and secured upon the tube, the outwardly open cups U-shaped in diametrical cross section and secured upon the tube in contact with the former cups, the ball case secured in the cups, and the sprocket wheel fixed in the outwardly open cup in the plane of the ball case within it.

5. In a front wheel hub, the tube or hub shaft provided near its ends with the non-integrally formed cups having central, external tubular extensions to fit the hub shaft, and also having their outer ends flanged to diverge from the axis, substantially as set forth.

In testimony whereof I affix my signature in presence of two witnesses.

ALBERT PERKINS.

Witnesses:
HENRY N. LYON,
SIDNEY SANDERS.